United States Patent [19]

Hott

[11] 4,444,235
[45] Apr. 24, 1984

[54] ATTACHMENT FOR A WOODWORKING PLANE

[76] Inventor: Ronald K. Hott, 5533 Pony Farm Dr., Richmond, Va. 23227

[21] Appl. No.: 294,410

[22] Filed: Aug. 19, 1981

[51] Int. Cl.³ .......................................... B27G 17/02
[52] U.S. Cl. ....................................... 145/20; 145/6; 145/10
[58] Field of Search ............... 145/20, 6, 10; 248/674; 30/293, 375, 376

[56] References Cited

U.S. PATENT DOCUMENTS

| | | | |
|---|---|---|---|
| 129,508 | 7/1872 | Alexander . | |
| 185,442 | 12/1876 | Gladwin | 145/10 |
| 201,068 | 3/1878 | Taylor . | |
| 228,766 | 6/1880 | Kinney | 145/20 |
| 661,559 | 11/1900 | Smith | 145/20 |
| 805,841 | 11/1905 | Carson | 145/20 |
| 857,514 | 6/1907 | Beasley . | |
| 1,432,035 | 10/1922 | Potter | 145/20 |
| 1,699,395 | 1/1929 | Johansson . | |
| 2,674,285 | 4/1954 | Bratton . | |
| 2,699,805 | 1/1955 | Richter . | |
| 2,752,963 | 7/1956 | Streckert | 145/20 |

FOREIGN PATENT DOCUMENTS 130551  1/1951  Sweden ................................. 145/6

OTHER PUBLICATIONS

"How to Edge-Plane Boards Accurately", *American Builder*, Herbert E. Fey, May 1948, p. 116.

*Primary Examiner*—Frederick R. Schmidt
*Assistant Examiner*—Debra S. Meislin
*Attorney, Agent, or Firm*—Norman B. Rainer

[57] ABSTRACT

An attachment device for a woodworking plane is provided to enable said plane to accurately cut end surfaces of wooden panels. Said end surfaces may be cut either at a right angle or at angles deviating therefrom by as much as 20°. The device is attached to a plane by two mounting screws within slotted passageways. A third screw, positioned in a threaded hole above said mounting screws, is manually adjusted in association with said mounting screws to control the angle of an abutment surface disposed below the underside of the plane.

6 Claims, 4 Drawing Figures

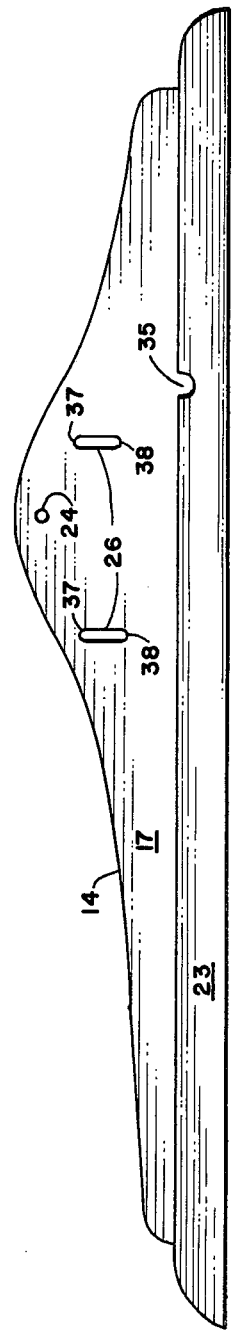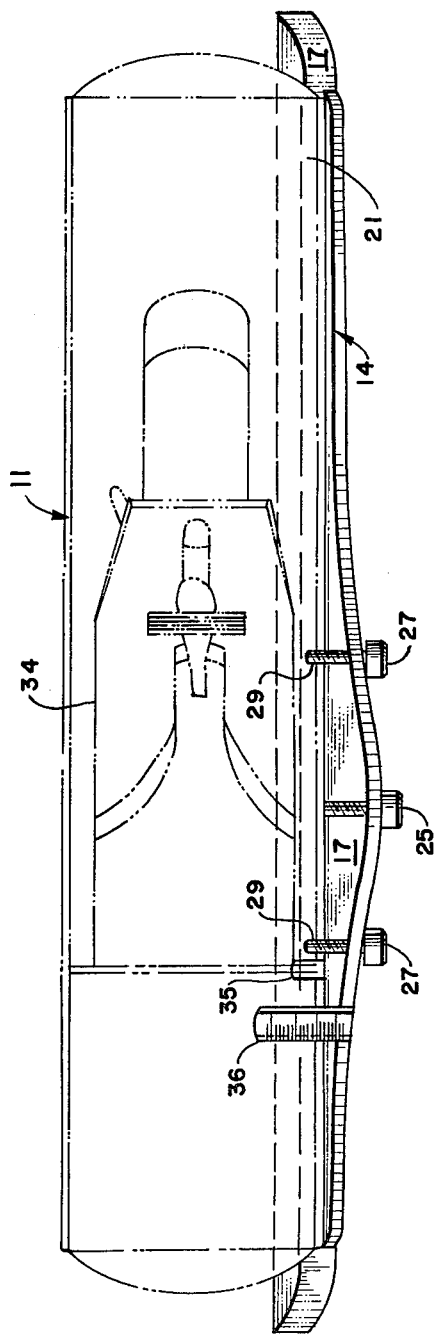

ATTACHMENT FOR A WOODWORKING PLANE

BACKGROUND OF THE INVENTION

This invention concerns an attachment device for a woodworking plane, and is further directed to a woodworking plane provided with an attachment which enables said plane to produce straight edge surfaces of various desired angles with respect to the face of a workpiece.

In the course of woodworking operations, a manually operated plane is frequently utilized to smooth or straighten surfaces, particularly the end or edge surfaces of a relatively large flat workpiece having at least one substantially straight edge. In the case of panels such as doors, and in other woodworking applications, it is often found desirable to cause the edge surface to be angled at other than 90° with respect to the front or rear surfaces of the panel. It is sometimes sought to cause said edge surfaces to deviate by about 5 to 20 degrees from the 90 degree configuration initially present at the edges of the panel.

Numerous devices have been proposed as attachments to woodworking planes to facilitate the cutting of edge surfaces at accurate angles with respect to face surfaces. Such devices, however, have either been inaccurate, expensive or cumbersome to use.

Accordingly, it is an object of this invention to provide an attachment device which will enable a woodworking plane to cut straight edge surfaces of a workpiece at an accurate and adjustable angle with respect to a face surface of said workpiece.

It is another object to provide a device of the aforesaid nature of simple and rugged construction which may be economically manufactured.

It is a further object of the present invention to provide a device of the aforesaid nature which may be rapidly applied to and removed from a plane, and is simple to operate.

It is a still further object of this invention to provide a woodworking plane equipped with an improved attachment device which enables said plane to cut straight edge surfaces of a workpiece at an accurate angle with respect to a face surface of said workpiece.

These objects and other objects and advantages of the invention will be apparent from the following description.

SUMMARY OF THE INVENTION

The above and other beneficial objects and advantages are accomplished in accordance with the present invention by an improved attachent device which comprises an elongated rigid bracket comprised of a side panel having upper, lower, forward and rearward extremities and parallel flat outside and inside faces. A shelf portion emerges perpendicularly from the inside face of said side panel as a continuous extension thereof. The shelf portion is comprised of a flat straight ledge surface perpendicularly disposed to the inside face of the side panel along its entire length, the distal extremity of said ledge surface furthest removed from said side panel being a straight 90° edge parallel to the inside face of said side panel. A groove is provided in said ledge surface running in a direction perpendicular to said side panel.

The shelf portion is further comprised of an abutment face extending downwardly from said 90° edge and parallel to the inside face of said side panel. The lower, forward and rearward extremities of said shelf portion are substantially continuous extensions of the corresponding extremities of said side panel. The height of the abutment face of the shelf portion, measured from the 90° edge to the lower extremity, exceeds the thickness of said side panel.

The side panel is provided with a threaded channel adjacent its upper extremity and substantially centered between forward and rearward extremities, said channel communicating perpendicularly between the inside and outside faces of said side panel. Two non-threaded channels, also communicating perpendicularly between inside and outside faces, are disposed below said threaded channel and spaced laterally so as to have said threaded channel positioned therebetween.

In operation, the bracket is attached to a side wall of a plane by means of threaded bolts which pass through the nonthreaded channels in the side wall of the bracket and engage threaded holes in the side wall of the plane. A threaded positioning bolt engages the threaded channel of said side panel and is extended toward the side wall of the plane until abutting contact is made therewith. The effect of the three threaded bolts is to lock the bracket to the plane in a desired position. In such locked position, the 90° edge of said shelf portion rests in abutment with the underside of the plane, and the inside face of said shelf serves as a guide surface for a workpiece disposed at a predetermined angle with respect to the underside of the plane.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a top view of the embodiment of FIG. 1.

FIG. 4 is a side elevational view of that side of the attachment of this invention opposite to the side illustrated in FIG. 1.

DETAILED DESCRIPTION OF THE PREFERRED EMBODIMENT

Figure 1:
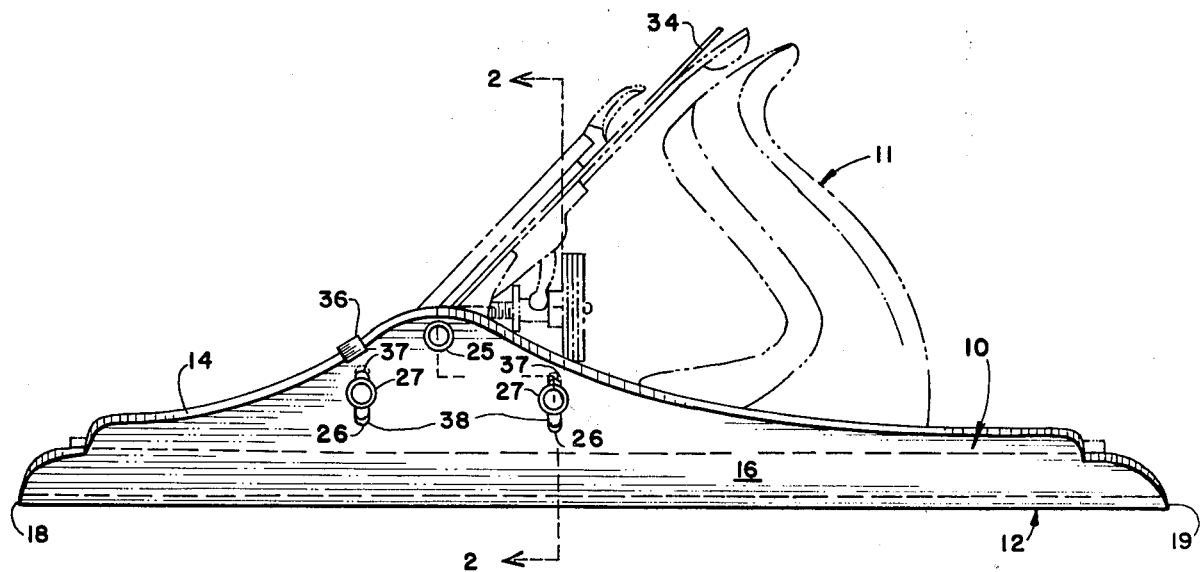
FIG. 1 is a side view of an embodiment of attachment device of the present invention mounted in operative position on a woodworking plane.

Referring now to FIG. 1, an attachment device 10 of the present invention is operatively associated with woodworking plane 11. The attachment device is comprised of a bracket 12 shown more clearly in FIG. 2, said bracket comprising a side panel 13 having upper edge 14 which generally follows the contour of the side wall 15 of plane 11, flat outside and inside faces 16 and 17 respectively, front extremity 18, rear extremity 19, and shelf portion 20 substantially integral with side panel 13. Said shelf portion is comprised of ledge 21 which is a flat straight surface perpendicularly disposed to inside face 17 and extending the entire length thereof. The distal extremity of ledge 21 is straight abutment edge 22 in the form of a 90° corner which runs parallel to inside face 17. An abutment face 23 extends downwardly from edge 22 and parallel to inside face 17.

Threaded channel 24, which passes through side panel 13, is positioned adjacent upper edge 14 of said side panel. Upper threaded bolt 25 is positioned therein, said bolt having a length sufficient to contact side wall 15 of the woodworking plane. Two vertically elongated slot-like channels 26 are positioned below channel 24 and laterally spaced approximately equidistantly therefrom. The cross-sectional configuration of said slotted channels is elongated, having an upper end 37 and lower end 38. Lower threaded bolts 27, of sufficiently smaller diameter than the diameter of channels 26, are free-sliding therein, their distal extremities 28, however, engaging threaded holes 29 within side wall 15 of the plane.

The entire bracket is of stiff construction, preferably fabricated from a single piece of metal stock such as aluminum or magnesium.

In operation, bracket 12 is attached to the side wall 15 of the plane by means of threaded bolts 27. If said bolts are drawn tightly to wall 15, while upper bolt 25 is sufficiently backed out of channel 24 so as not to contact wall 15, then inside face 17 of side panel 13 will be flush against wall 15. In such position, abutment face 23 will extend perpendicularly below the underside 30 of said plane and will serve as an abutment guide which slidingly contacts face 31 of workpiece 32. In such mode of operation, the attachment enables the plane to accurately cut the edge surface 33 of said workpiece at a right angle.

Figure 2:
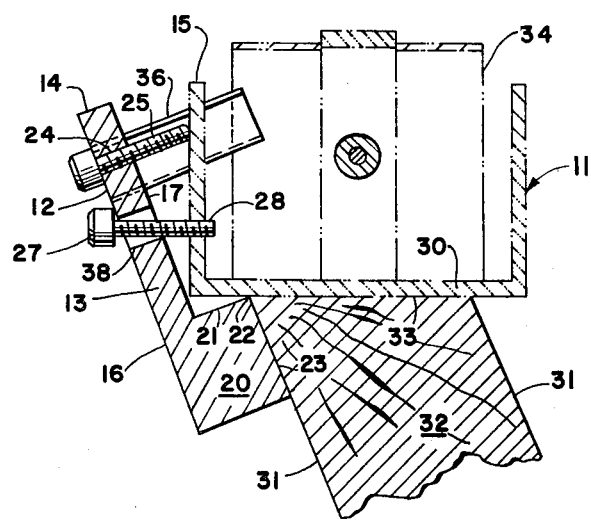
FIG. 2 is sectional view taken along the line 2—2 of FIG. 1.

In the position of the attachment shown in FIG. 2, upper bolt 25 is caused to penetrate side panel 13 and engage wall 15 of the plane. The lower bolts 27 are appropriately tightened so that, whereas bolt 25 is pushing the upper portion of side panel 13 away from the plane, said lower bolts draw said side panel toward the plane. The result of the tightening of the three bolts is to cause abutment edge 22 to fit tightly against the underside of the plane, and disposes abutment face 23 at an angle to said underside which parallels the long axis of the plane. The edge surface 33 of said workpiece can now be accurately cut at the angle chosen.

Because abutment edge 22 lies over the protruding cutting edge of the blade 34 of plane 11, groove 35 is positioned in ledge 21 perpendicularly oriented with respect to side panel 13. Angle measuring means in the form of extension 36 may be positioned atop side panel 13. Said measuring means may have indicia thereon which, when visually aligned with wall 15 of plane 11 represents the angle at which abutment surface 23 is disposed to the underside 30 of said plane.

The attachment device of this invention may be easily mounted onto a standard plane by providing two properly spaced threaded holes in one of its side walls. Thereafter, addition or removal of the device, and adjustment of the cutting angle requires merely finger manipulation of the three bolts, which for convenience may have knurled or wing heads.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

In an alternative embodiment of the invention, shelf portion 20, instead of being an integral extension of side panel 13, may be a separate member which may be bolted to either side of said side panel. The advantage of such embodiment is that it permits mounting on either side of a plane to accommodate left-handed or right-handed persons.

Having thus described my invention, what is claimed is:

1. An attachment adapted to be mounted upon a woodworking plane having sidewalls rising from a flat underside associated with a cutting blade, said plane and attachment mounted thereon being adapted to cut an edge surface adjacent a face surface of a workpiece, said attachment being comprised of:
   (A) an elongated rigid bracket comprised of:
      (a) a side panel having upper, lower, forward and rearward extremities and parallel flat outside and inside faces, a threaded channel adjacent said upper extremity perpendicularly communicating between said outside and inside faces, two slotted channels disposed below said threaded channel and substantially equally spaced therefrom, said slotted channels communicating perpendicularly between said outside and inside faces, the cross-sectional configuration of said slotted channels being elongated with two ends, said ends being directed toward upper and lower extremities of said side panel,
      (b) a ledge associated with the inside face of said side panel and extending substantially the entire length thereof, said ledge having a flat upper surface extending perpendicularly from said inside face and terminating in a corner edge disposed parallel to said inside face and serving as an abutment edge adapted to contact the underside of said plane,
      (c) a flat abutment face extending downwardly from said abutment edge along its entire extent and adapted to lie against the face surface of said workpiece, and
      (d) a groove recessed into the flat upper surface of said ledge and disposed in a manner to accommodate said cutting blade, and
   (B) three machine bolts, each comprised of a head and a threaded shaft, said threaded shafts being adapted to enter said threaded and slotted channels at the outside face of said side panel and extend beyond the inside face of said panel when the heads of said bolts abut against said outside face, whereby the bolt which engages the threaded channel adjacent the upper extremity of the bracket acts upon the sidewall of the plane to urge the bracket away from the plane, and the bolts which engage said slotted channels serve to draw said bracket toward the plane, thereby urging said abutment edge tightly against the underside of the plane and causing said abutment face to be disposed at adjustable angles with respect to the underside of said plane,
   whereby the edge surface of said workpiece may be cut at an angle of between 70° and 90° with respect to the face surface of said workpiece.

2. The bracket of claim 1 wherein angle-measuring means are associated with the upper extremity of said side panel.

3. The bracket of claim 1 wherein said ledge is a continuous integral extension of said side panel.

4. The bracket of claim 1 wherein said ledge is a separate member which is attached to said side panel.

5. The bracket of claim 1 wherein the heads of said bolts are provided with means to facilitate finger tightening.

6. The bracket of claim 1 wherein said ledge has a lowermost extremity which is coplanar with the lower extremity of said side panel.

* * * * *